United States Patent [19]
Bradley et al.

[11] 3,936,632
[45] Feb. 3, 1976

[54] POSITION DETERMINING SYSTEM

[75] Inventors: William C. Bradley, Chelmsford;
Allen H. Greenleaf, Lexington;
Roger K. Lee, Jr., Watertown, all of Mass.

[73] Assignee: Itek Corporation, Lexington, Mass.

[22] Filed: Jan. 3, 1974

[21] Appl. No.: 430,422

[52] U.S. Cl.......................... 250/237 R; 250/203 CT
[51] Int. Cl.$^2$ ............................................ G01J 1/20
[58] Field of Search........ 250/237 G, 237 R, 203 R, 250/203 CT

[56] References Cited
UNITED STATES PATENTS

| | | | |
|---|---|---|---|
| 2,641,712 | 6/1953 | Kircher........................... | 250/203 R |
| 3,096,441 | 10/1961 | Burkhardt...................... | 250/237 R |
| 3,133,200 | 5/1964 | Collyer........................... | 250/203 R |
| 3,344,700 | 10/1967 | Brake............................. | 250/237 G |
| 3,781,110 | 12/1973 | Leitz et al...................... | 250/237 G |

*Primary Examiner*—James W. Lawrence
*Assistant Examiner*—T. N. Grigsby
*Attorney, Agent, or Firm*—Homer O. Blair; Robert L. Nathans; Gerald H. Glanzman

[57] ABSTRACT

A system for precisely determining the position of a beam of incident radiation. In one embodiment in the disclosure the system is utilized in an orbiting, Ritchey-Chretien telescope to determine the precise position of the image of a guide star in the focal plane of the telescope. In that embodiment a first reticle plate, having concentric ring reticle lines, is located at the edge of the tangential focal surface of the telescope and outside of the focal area being used for observation. A second reticle plate, having radial reticle lines, is located adjacent to the first reticle plate at the edge of the sagittal focal surface of the telescope and outside of the focal area being used for observation. A relay lens system and an image dissector tube are positioned behind the reticle plates so that light refracted by the reticle plates is passed by the relay lens system to the image dissector tube. A guide star is imaged on the first and second reticle plates. Light in the star image which is imaged onto either an apex or a groove in the reticle plates is split into separate beams in dependence upon the exact position of the image relative to the apex or groove. The position of the guide star image is precisely located first in a coarse position mode and secondly in a fine position mode. In the coarse position mode the image dissector tube aperture is scanned to find the overall locations of the separate beams, and the deflection signals of the image dissector tube at those locations determine the particular apex or groove in each reticle plate upon which the star is imaged. In the fine position mode the amount of light in each of the separate beams formed by the reticle plates is measured by the image dissector tube in a photon counting mode. This determines the exact position of the star image relative to the particular apex or groove in each reticle plate upon which the star image is incident.

15 Claims, 10 Drawing Figures

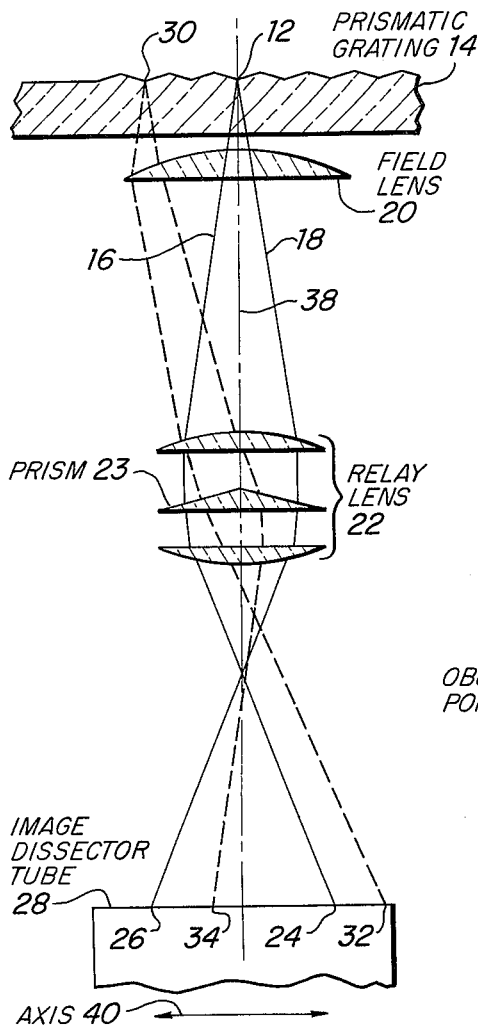
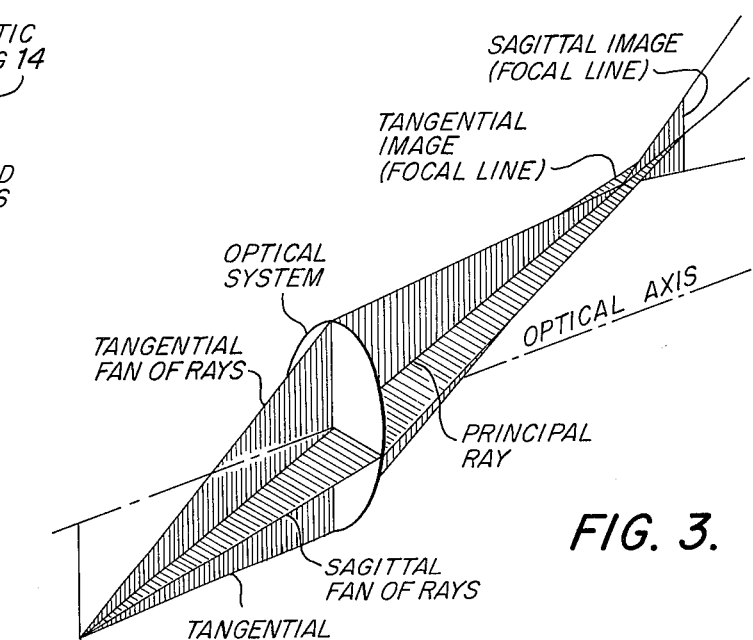
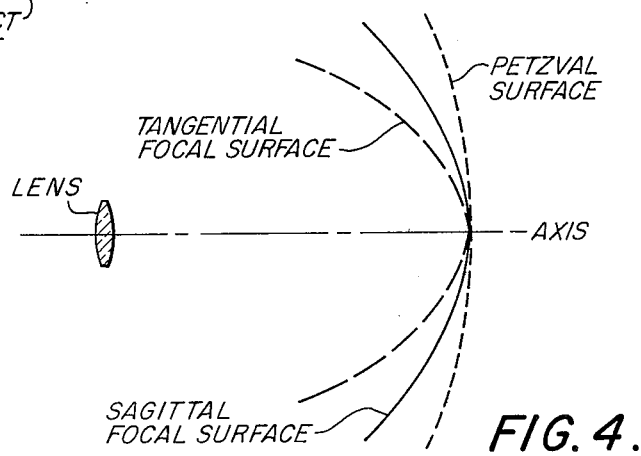
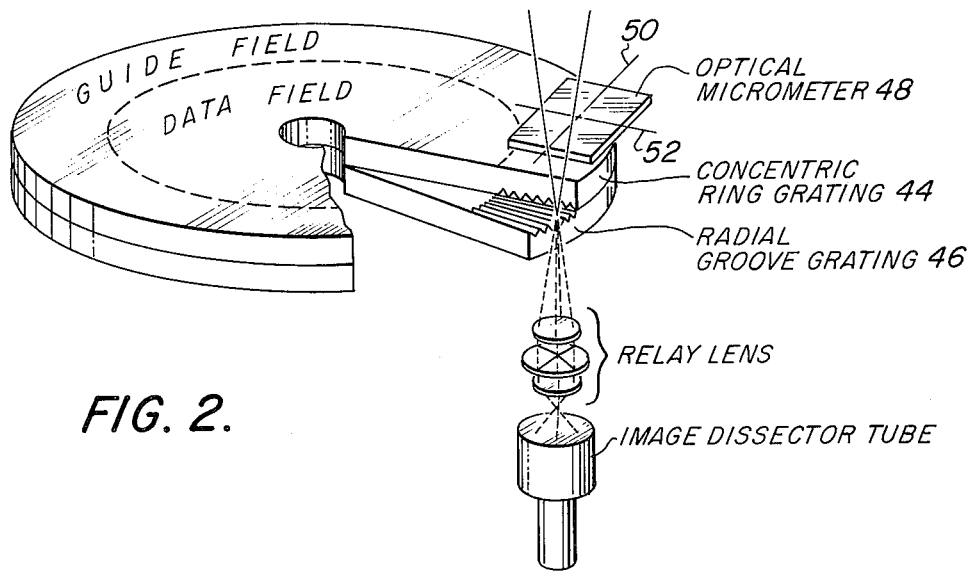
FIG. 1.
FIG. 3.
FIG. 4.
FIG. 2.

POSITION DETERMINING SYSTEM

BACKGROUND OF THE INVENTION

The present invention relates generally to a system for precisely determining the position of a beam of incident radiation for an optical system. More particularly, the present invention relates to such a system which has particular utility in a large, orbiting telescope to accurately determine the position of a guide star relative to the telescope. The requirements of the large space telescope being considered by NASA demand that a new type of star tracker be designed. This telescope must be stabilized in its orientation to very small tolerances. The error signal for the stabilization is provided by a star tracker at the telescope focal plane that locks onto guide stars in the field of view of the telescope but outside of the data field being used for observation. The construction of the star tracker must be such that a geometrically stable relationship is maintained between the lock on point of the star tracker and the data object over periods as long as forty hours. The goal for this stability is .18 um at the focal plane. Further, the guide fields must be large enough that a high probability exists of finding suitable guide stars in the field for any data object in the sky. Because of practical limitations on the size of the guide field, the star tracker must use the guide starlight as efficiently as possible and must be noise limited only by the photoelectron noise of the sensor in order that many numerous dimmer stars may be used for guiding. The star image upon which the star tracker operates must be virtually diffraction limited in order that maximum sensitivity may be obtained. The initial pointing of the vehicle is expected to be accurate to within a diametral error of 300 urad. The star tracker must be able to find its guide star within that area and point the telescope absolutely to within about 0.12 urad.

SUMMARY OF THE INVENTION

In accordance with a preferred embodiment, a system is disclosed for precisely determining the position of a beam of incident radiation. A unique aspect of this system is that all of the radiation in the beam is utilized to determine its position. This is in contrast with many prior art systems wherein much of the radiation is blocked by opaque portions of a reticle. The present invention was designed for use in precisely determining the position of a very faint star, and accordingly use of all the light from the star is of prime importance. The preferred embodiment utilizes a prismatic grating having a plurality of spaced prismatic grooves. The prismatic groove upon which the radiation beam is incident refracts the radiation into several separate beams. The relative intensity of each beam varies in accordance with the precise position of the incident radiation relative to that prismatic groove. The relative intensities of the separate beams produced by the prismatic groove are measured, which defines the precise position of the incident radiation beam relative to that particular prismatic groove. Further, the preferred embodiment provides such a system wherein an image dissector tube is utilized to detect radiation passed by the prismatic grating. The image dissector tube is utilized in a first mode to determine the relative positions of the separate beams produced by the prismatic grating. In this mode the aperture of the image dissector tube is scanned, and the deflection signals of the image dissector tube at the locations of the separate beams are utilized to determine the particular prismatic groove upon which the radiation beam is incident. Once that particular groove is determined, the image dissector tube is utilized in a second, photon-counting mode to determine the relative intensities of the beams produced by the prismatic grating. The relative intensities of those beams determine the precise position of the incident beam of radiation relative to the particular prismatic groove upon which it is incident.

In the illustrated embodiment, the system is utilized to determine the precise position of a guide star in an off-center guide field in a Ritchey-Chretien telescope. A first concentric ring prismatic grating is positioned at the tangential focal surface of the telescope while a second radial prismatic grating is positioned at the sagittal focal surface of the telescope. In this manner, the precise radial and angular positions of the guide star are determined. Further, in accordance with one embodiment, the circumferential prismatic grating is formed as a combined fresnel lens to eliminate one optical component within the system. Also, in accordance with another embodiment of the invention, the spatial frequency of the prismatic grooves on each prismatic grating is selected to be one-half the cut-off frequency of the Ritchey-Chretien optical system, whereby harmonics of radiation above the fundamental are of spatial frequencies at or above the cut-off frequency of the optical system and are not transmitted.

BRIEF DESCRIPTION OF THE DRAWINGS

FIG. 1 illustrates the basic principle of operation of the present invention.

FIG. 2 illustrates a preferred embodiment of a star tracker utilizing the teachings of Applicants' invention.

FIGS. 3 and 4 show the astigmatic image surfaces produced by a Ritchey-Chretien telescope.

DESCRIPTION OF A PREFERRED EMBODIMENT

Figure 5A:
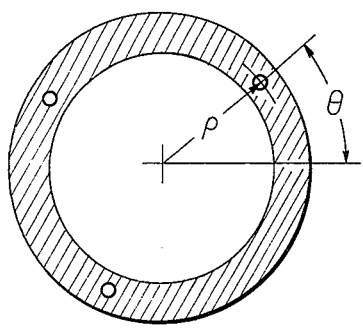
FIGS. 5a–5c illustrate three alternate embodiments of star trackers using the teachings of Applicants' invention.

Referring to FIG. 1, there is illustrated the basic principle of operation of Applicants' invention. In FIG. 1 a beam of radiation is focused at location 12 on a groove in a prismatic grating 14. The portion of the beam falling to the left of the groove is refracted into a first beam 16. The portion of the beam falling to the right of the groove is refracted into a second beam 18. A field lens 20 and a relay lens system 22 further refract the first and second beams 16 and 18 respectively to points 24 and 26 on the face of an image dissector tube 28. The relay lens system 22 includes a prism 23 which assists in further separating the radiation beams 16 and 18. For purposes of illustration, a second star image at point 30 is shown refracted by the same system to points 32 and 34 on the face of the image dissector tube.

FIG. 1 illustrates the basic principle of operation of Applicants' invention, which will now be explained. The position of the incident radiation beam relative to prismatic grating 14 is determined first in a coarse position mode, and secondly in a fine position mode. In the coarse position mode, the overall location of the incident beam relative to the prismatic grating 14 is determined. This determination must be sufficiently accurate to ascertain the particular groove or apex on which the beam is incident. The explanation of this invention in this patent application is given in terms of prismatic grooves, but it should be realized that the term prismatic groove is being used synonymously with the term prismatic apex. As shown in FIG. 1, when the incident beam 12 is directly on the axis 38, the refracted beams 24 and 26 are centered about axis 38. As the incident beam moves to the left to point 30 the refracted beams 32 and 34 move to the right along axis 40 relative to the image dissector tube. As illustrated by these examples the positions of the two refracted beams along axis 40 are negatively proportional to the position along that axis of the incident beam. The positions of the beams 24 and 26 are located by scanning the aperture of the image dissector tube. The image dissector deflection signals at those positions determine the location of the incident beam 12. The accuracy of the coarse measuring mode, which is basically limited by the accuracy of the image dissector tube, must be sufficient to determine the particular groove of the prismatic grating on which the incident beam falls. After the incident beam is coarsely located, its exact position relative to the prismatic grating 14 is determined by the relative intensities of the separate beams produced by the grating. Referring back to the beam which is incident at point 12, if it is exactly centered upon the groove, then the light beams 16 and 18 will each have an equal intensity. If it moves slightly to the left, then the intensity of beam 16 will increase while the intensity of beam 18 will decrease. Thus the exact position of the incident beam relative to the prismatic groove may be determined by measuring the relative intensitites of the separate beams produced by the grating. In the fine position mode, the image dissector tube is utilized in a photon counting mode to determine the relative intensities of each of the beams.

The basic concept of Applicants' invention has been explained with respect to one axis 40. However, the concept operates in two dimensions as follows. If the prismatic grating 14 is cut in two directions, such that the top of the grating appears like a plurality of pyramids, then the light will be refracted by the grating 14 in two directions. Alternatively, two separate prismatic gratings located closely adjacent to each other might be utilized. The prism 23 is a quad prism, also in the shape of a pyramid. Image dissector tube 28 also functions in x and y directions, as is well known in the art, by utilizing x and y deflection signals.

The image dissector tube may be used in several modes as follows. In the two dimensional xy embodiment the geometric pattern of the four radiation beams produced by the prismatic grating will be fixed regardless of the particular locations of the beams. The image dissector tube would be constructed with four separate electron multipliers. The electron target of the image dissector tube would have four apertures arranged in the same geometric pattern as the four radiation beams. Each aperture would be the entrance to one electron multiplier tube. With the geometric arrangement of the apertures being the same as the geometric pattern of the beams, electrons caused to be emitted by the four radiation beams may be steered by the x and y deflection signals to the four electron multipliers. In the coarse position mode, the x and y deflection signals of the image dissector tube would be put into a raster search pattern until the four beam pattern on the face of the tube is located. Once it is located, the x and y deflection signals would be maintained constant to steer the four electron beams into the four entrance apertures to the four electron multipliers. The output of each electron multiplier would then be a measurement of the intensity of one particular radiation beam.

Referring to FIG. 2, there is illustrated a preferred embodiment of a star tracker utilizing the teachings of Applicants' invention in a Ritchey-Chretien telescope, which is currently being considered for use as an orbiting telescope. The principles explained above are utilized to precisely determine the position of an image of a guide star formed in the guide field section of the telescope's focal plane. FIG. 2 shows the relative locations of the data field and the guide field. The data field consists of those portions of the focal plane closest to the optical axis of the telescope wherein aberrations produced by the telescope are the least. The guide field is located around the data field and is utilized for pointing the telescope. The guide field is a significant distance from the optical axis of the telescope. FIGS. 3 and 4 illustrate the astigmatic image surfaces formed by a Ritchey-Chretien telescope. As shown the tangential focal surface separates from the sagittal focal surface with significant departures from the optical axis. Accordingly, in the guide field the tangential and sagittal images of the guide star will be separated. This separation of images may be utilized to advantage with Applicants' invention by positioning one prismatic grating at the tangential focal surface and a second prismatic grating at the sagittal focal surface. The two prismatic gratings, the first with concentric grooves and the second with radial grooves, are spaced apart by the separation between the astigmatic images.

The groove spacings of the gratings 44 and 46 are determined by the required pointing accuracy of the system. The spacing between grooves on each grating may be enlarged if the system is capable of shifting the star image small distances over the gratings. This may be accomplished by an optical micrometer, a plane parallel glass plate 48 in front of the guide field, which may be tilted about two axis 50 and 52 to provide position interpolation between the grooves of the gratings. The groove spacings may then be enlarged to a point determined by the precision of the optical micrometer. For the LST, the optical micrometer 48 is necessary to achieve the desired pointing accuracy while also maintaining the desired acquisition range of the coarse tracker.

Figure 5B:
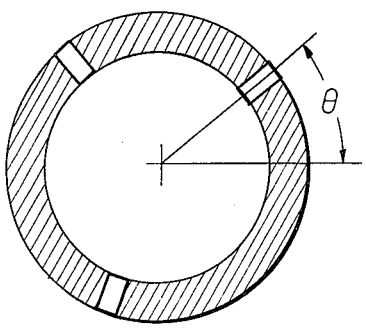
Figure 5C:
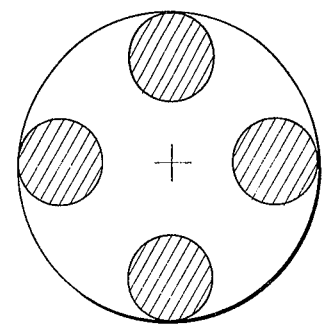

There are several approaches to maximize coverage in the guide field so that a maximum number of stars are available for pointing purposes. FIG. 5 illustrates three different approaches to achieve maximum coverage of the guide field. In referring to the embodiments in FIG. 5, each imaging system, which includes the field and relay lens systems and the image dissector tube, will be referred to as a tracker head. FIG. 5a illustrates one possible approach in which three tracker heads, each having a very narrow field coverage, are movable about the guide field. A polar coordinate positioning mechanism is required to position each head at the appropriate position in the guide field. With this configuration, two tracker heads would be used to determine, roll, pitch, and yaw of the telescope, and the third tracker head would be included for redundancy. The embodiment of FIG. 5b is very similar to the embodiment of FIG. 5a, except that each of the three trackers have expanded radial field coverage, and each track head requires only an angular positioning mechanism. Again, two tracker heads would be used for roll, pitch, and yaw determination, and the third tracker head would be included for redundancy. The embodiment of FIG. 5c includes four fixed tracker heads with each covering a rather wide field. The embodiment of FIG. 5c is the preferred embodiment as it is the simplest, most reliable, and most easily configured arrangement. With a system as illustrated in FIG. 5c a large field lens, illustrated as element 20 in FIG. 1 would be required for each guide field.

Figure 6:
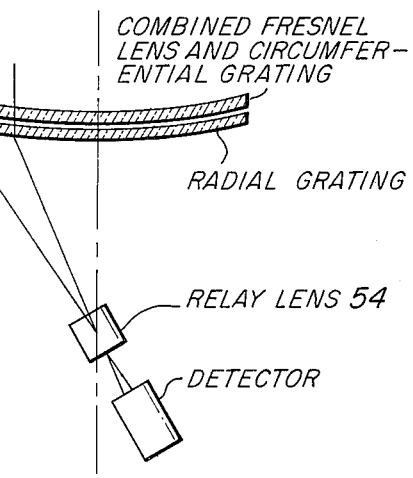
FIG. 6 depicts an alternative embodiment in which a double faceted fresnel lens serves as both a field lens and an image splitter.
Figure 7:
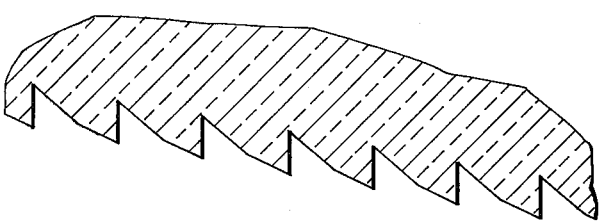
FIG. 7 shows a magnified view of the groove profile of the fresnel lens of FIG. 6.

FIGS. 6 and 7 illustrate an embodiment which replaces each large field lens by using a combined grating 52 which combines the properties of a fresnel lens with the properties of prismatic grating. This system might be designed to use simply the combined grating and an off-the-shelf relay lens 54, as illustrated in FIG. 6. The combined grating would have a groove profile as illustrated in FIG. 7. Each facet of a normal fresnel lens would be separated into two facets with a slight angle between them. The combined grating would thus be able to serve as both a field lens and an image splitter.

Figure 8:
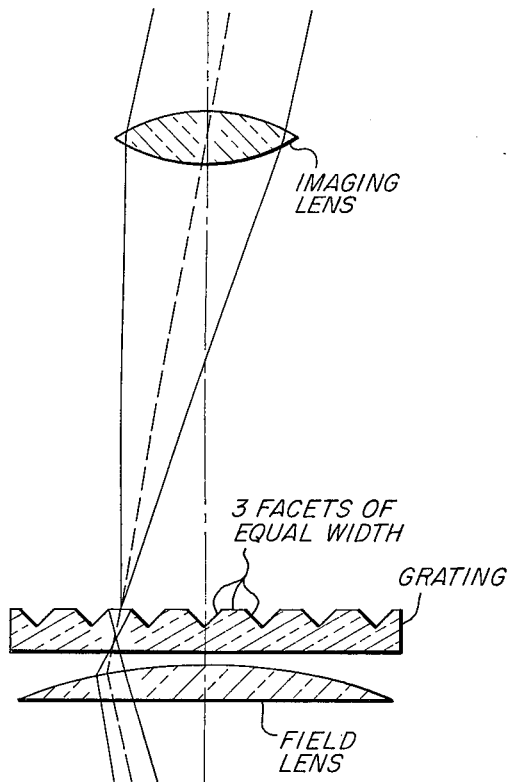
FIG. 8 illustrates an embodiment in which the prismatic grating has grooves with three different slopes to divide the star image into three separate beams.

FIG. 8 illustrates another alternative embodiment in which the prismatic grating is formed with facets at three separate slopes to divide the star image into three separate beams, rather than two separate beams as illustrated by the embodiment of FIG. 1. The spatial frequency of the prismatic grating is selected to be half the cut-off frequency of the imaging optics for the following reason. Assume that a star image is moving across the grating at a constant rate such that light energy passing through any of the three optical channels varies sinusoidally with time. With the spatial frequency of the prismatic grating being half the cut-off frequency of the imaging optics, all harmonics of the waveform above the fundamental are of spatial frequencies at or above the cut-off frequency of the optics and are not transmitted. In the two dimensional embodiment, the grating is cut in two directions such that it is composed of many four sided pyramids with flat tops. Five optical channels result therefrom. This embodiment functions essentially similar to the embodiment of FIG. 1. That is, the position of the five point pattern on the face of the image idssector tube gives a coarse measure of the star image on the grating. The relative energy in each of the five channels yields the exact position of the star image relative to the prismatic grating.

Although the illustrated embodiments determine the position of an incident radiation beam, the teachings of this invention may also be utilized in a like manner to determine the rate and direction of movement of the incident radiation beam. While several embodiments have been described, the teachings of this invention will suggest many other embodiments to those skilled in the art.

We claim:

1. A system for precisely determining the position of a beam of incident radiation and comprising:
   a. a prismatic grating means having the beam of radiation incident thereon and having a plurality of spaced prismatic grooves with the prismatic groove upon which the radiation beam is incident refracting the radiation into several separate beams with the relative intensity of each beam varying according to the precise position of the incident radiation relative to that prismatic groove;
   b. means for determining the particular prismatic groove upon which said radiation beam is incident, said determining means including means responsive to the location of at least one of said several separate beams of radiation; and,
   c. means for measuring the relative intensities of the separate beams of radiation produced by said prismatic grating means, whereby the precise location of the incident radiation beam relative to the prismatic groove upon which the radiation beam is incident may be determined.

2. A system as set forth in claim 1 wherein said determining means include:
   a. an image dissector tube for scanning its input aperature to determine the locations of radiation beams incident thereon; and
   b. an optical system for relaying radiation refracted by said prismatic grating means to said image dissector tube.

3. A system as set forth in claim 2 and wherein said image dissector tube is also utilized as said measuring means.

4. A system as set forth in claim 1 wherein said prismatic grating means includes a first plurality of prismatic grooves, and a second plurality of prismatic grooves crossing substantially perpendicular to said first plurality of prismatic grooves, whereby the incident radiation beam will be refracted into four separate beams of radiation, the relative intensities of which determine the precise location of said incident beam of radiation relative to two particular perpendicularly crossing prismatic grooves of said prismatic grating means.

5. A system as set forth in claim 4 wherein each said prismatic groove of prismatic grating means includes more than two facets, whereby the incident beam of radiation will be divided into a number of beams of radiation, more than two, depending upon the number of facets of each prismatic groove.

6. A system for precisely determining the position of a beam of incident radiation and comprising:
   a. a prismatic grating means having the beam of radiation incident thereon, said prismatic grating means including a first prismatic grating having a plurality of concentric prismatic grooves and a second prismatic grating having a plurality of radial prismatic grooves crossing substantially perpendicular to said plurality of concentric prismatic grooves whereby the incident radiation beam will be refracted into four separate beams of radiation, the relative intensities of which determine the precise location of said incident beam of radiation relative to two particular perpendicularly crossing prismatic grooves of said prismatic grating means; and,
   b. means for measuring the relative intensities of said separate beams of radiation produced by said prismatic grating means, whereby the precise location of the incident radiation beam relative to the prismatic grooves upon which the radiation beam is incident may be determined.

7. A system as set forth in claim 6 wherein the system is used in a Ritchey-Chretien optical system and said first prismatic grating is positioned at the tangential focal surface of said telescope and said second prismatic grating is positioned at the sagittal focal surface of said telescope.

8. A system as set forth in claim 7 and including means for determining the particular prismatic groove upon which the radiation beam is incident.

9. A system as set forth in claim 8 wherein said determining means include:
   a. an immage dissector tube for scanning its input aperture to determine the locations of radiation beams incident thereon; and
   b. and optical system for relaying radiation refracted by said prismatic grating means to said image dissector tube.

10. A system as set forth in claim 9 and wherein said image dissector tube is also utilized as said measuring means.

11. A system as set forth in claim 10 wherein said optical system for relaying radiation refracted by said prismatic grating means includes a field lens system.

12. A system as set forth in claim 11 wherein said field lens system and said first prismatic grating are combined in a combined fresnel grating having a multi-faceted surface which refracts light as a fresnel lens in the field lens system and also divides incident radiation into separate beams as said first prismatic grating.

13. A system as set forth in claim 12 and wherein the spatial frequencies of said prismatic grooves on said prismatic grating means are selected to be one half the cut-off frequency of said Ritchey-Chretien optical system, whereby harmonics of the incident radiation beam above the fundamental are of spatial frequencies at or above the cut-off frequency of said input optical system and are not transmitted.

14. A system as set forth in claim 13 wherein each said prismatic groove of prismatic grating means includes more than two facets, whereby the incident beam of radiation will be divided into a number of beams of radiation, more than two, depending upon the number of facets of each prismatic groove.

15. A system for precisely determining the position of a beam of incident radiation and comprising:
   a. a prismatic grating means having the beam of radiation incident thereon and having a plurality of spaced prismatic grooves with the prismatic groove upon which the radiation beam is incident refracting the radiation into several separate beams with the relative intensity of each beam varying according to the precise position of the incident radiation relative to that prismatic groove, each said prismatic groove of said prismatic grating means including more than two facets, whereby said incident beam of radiation will be divided into a number of beams of radiation, more than two, depending upon the number of facets of each prismatic groove; and,
   b. means for measuring the relative intensities of the separate beams of radiation produced by said prismatic grating means, whereby the precise location of the incident radiation beam relative to the prismatic groove upon which the raidation beam is incident may be determined.

* * * * *